United States Patent
Akutsu et al.

(10) Patent No.: US 7,096,479 B2
(45) Date of Patent: Aug. 22, 2006

(54) OPTICAL INFORMATION RECORDING MEDIUM

(75) Inventors: Osamu Akutsu, Fujisawa (JP); Masaru Hatakeyama, Yokosuka (JP); Satoru Yamashita, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 272 days.

(21) Appl. No.: 10/777,034

(22) Filed: Feb. 13, 2004

(65) Prior Publication Data

US 2004/0194122 A1    Sep. 30, 2004

(30) Foreign Application Priority Data

Mar. 27, 2003 (JP) .............. 2003-087777
Sep. 25, 2003 (JP) .............. 2003-333021

(51) Int. Cl.
*G11B 7/24* (2006.01)
(52) U.S. Cl. .................................... 720/718
(58) Field of Classification Search ................ 720/718, 720/725; 360/324.1; 369/288
See application file for complete search history.

(56) References Cited

U.S. PATENT DOCUMENTS

| | | | | |
|---|---|---|---|---|
| 5,479,382 A * | 12/1995 | Nishida et al. | ........... | 369/13.35 |
| 5,637,372 A | 6/1997 | Tominaga et al. | | |
| 5,965,229 A * | 10/1999 | Zhou et al. | ................. | 428/64.4 |
| 6,003,535 A | 12/1999 | Ollivier | | |
| 6,195,326 B1 * | 2/2001 | Yoshinari et al. | ........ | 369/275.4 |
| 2001/0016242 A1 | 8/2001 | Miyamoto et al. | | |
| 2002/0146643 A1 | 10/2002 | Shingai et al. | | |

FOREIGN PATENT DOCUMENTS

| | | |
|---|---|---|
| JP | 01-115685 | 5/1989 |
| JP | 01-251342 | 10/1989 |
| JP | 01-303643 | 12/1989 |
| JP | 2000-313170 | 11/2000 |

* cited by examiner

*Primary Examiner*—A. J. Heinz
*Assistant Examiner*—Mark Blouin
(74) *Attorney, Agent, or Firm*—Connolly Bove Lodge & Hutz LLP

(57) ABSTRACT

An optical information recording medium 10 is composed of at least a reflective layer 2, a first protective layer 3, a phase-change type optical recording layer 4 and a second protective layer 5 being sequentially laminated on a substrate 1. The optical information recording medium 10 is conducted to record information by changing a phase of the phase-change type optical recording layer 4 by irradiating light from the second protective layer 5 side. The phase-change type optical recording layer 4 further contains at least Ti, In, Ge, Sb and Te. When each content amount of the Ti, In, Ge, Sb and Te is defined as v, w, x, y and z in atomic percent respectively, each content amount of v, w, x, y and z in atomic percent satisfies following relations: $0.3 \leq v \leq 4$, $0.3 \leq w \leq 3$, $3.4 \leq x \leq 14.5$, $2.1 \leq y/z \leq 4$ and $98.8 \leq v+w+x+y+z \leq 100.\leq$.

1 Claim, 20 Drawing Sheets

| Sample No. | Ge [%]. | Sb [%]. | Te [%]. | Sb/Te. | Deteriorated reproduction less than 0.2 dB | Jitter less than 9% |
|---|---|---|---|---|---|---|
| 1 | 2.3 | 74.1 | 23.6 | 3.1 | | |
| 2 | 3.4 | 72.9 | 23.7 | 3.1 | Yes | Yes |
| 3 | 4.2 | 63.2 | 32.6 | 1.9 | | Yes |
| 4 | 4.3 | 65.1 | 30.6 | 2.1 | Yes | Yes |
| 5 | 4.5 | 67.8 | 27.7 | 2.4 | Yes | Yes |
| 6 | 4.5 | 78.2 | 17.3 | 4.5 | | Yes |
| 7 | 4.6 | 76.2 | 19.2 | 4.0 | Yes | Yes |
| 8 | 4.8 | 71.9 | 23.3 | 3.1 | Yes | Yes |
| 9 | 6.2 | 69.2 | 24.6 | 2.8 | Yes | Yes |
| 10 | 6.4 | 70.6 | 23.0 | 3.1 | Yes | Yes |
| 11 | 6.5 | 70.2 | 23.3 | 3.0 | Yes | |
| 12 | 7.2 | 75.4 | 17.4 | 4.3 | Yes | |
| 13 | 7.8 | 60.2 | 32.0 | 1.9 | Yes | Yes |
| 14 | 8.5 | 72.1 | 19.4 | 3.7 | Yes | Yes |
| 15 | 8.7 | 69.7 | 21.6 | 3.2 | Yes | Yes |
| 16 | 11.1 | 69.2 | 19.7 | 3.5 | Yes | Yes |
| 17 | 14.5 | 65.3 | 20.2 | 3.2 | Yes | |
| 18 | 15.8 | 66.5 | 17.7 | 3.8 | Yes | |

Fig. 4

| Sample | Recording power [mW] | | | | Strategy [T] | | | |
|---|---|---|---|---|---|---|---|---|
| No. | P1 | P2 | P3 | P4 | T1 | T2 | T3 | T4 |
| 2 | 5.2 | 2.7 | 0.1 | 0.1 | 0.4 | 0.4 | 0.7 | 0.7 |
| 4 | 5.2 | 2.7 | 0.1 | 0.1 | 0.4 | 0.4 | 0.7 | 0.7 |
| 7 | 5.2 | 3.4 | 0.1 | 0.1 | 0.5 | 0.5 | 0.8 | 0.8 |
| 17 | 5.2 | 2.7 | 0.1 | 0.1 | 0.4 | 0.4 | 0.7 | 0.7 |

Fig. 5

| Sample No. | Reproduction power 0.3 [mW] C/N [dB] | | Reproduction power 0.38 [mW] C/N [dB] | |
|---|---|---|---|---|
| | Immediately after | 5 minutes after | Immediately after | 5 minutes after |
| 2-v11 to 2-v14 & 2-v51 to 2-v54 | 50.2 | 50.2 | 51.1 | 51.1 |
| 4-v11 to 4-v14 & 4-v51 to 4-v54 | 50.1 | 50.1 | 51.1 | 51.1 |
| 7-v11 to 7-v14 & 7-v51 to 7-v54 | 50.2 | 50.2 | 51.2 | 51.2 |
| 17-v11 to 17-v14 & 17-v51 to 17-v54 | 50.2 | 50.2 | 51.3 | 51.3 |

Fig. 6

| | Sample No. | | | | | | | |
|---|---|---|---|---|---|---|---|---|
| | 2 | 2-v1 | 2-v2 | 2-v3 | 2-v4 | 2-v5 | 2-v6 | 2-v7 |
| Ge [%] | 3.4 | 3.4 | 3.4 | 3.4 | 3.4 | 3.4 | 3.4 | 3.4 |
| Sb [%] | 72.9 | 72.7 | 72.3 | 71.5 | 70.8 | 70.0 | 69.3 | 68.5 |
| Te [%] | 23.7 | 23.4 | 23.3 | 23.1 | 22.8 | 22.6 | 22.3 | 22.1 |
| Ti [%] | 0.0 | 0.5 | 1.0 | 2.0 | 3.0 | 4.0 | 5.0 | 6.0 |
| Sb/Te | 3.1 | 3.1 | 3.1 | 3.1 | 3.1 | 3.1 | 3.1 | 3.1 |
| Durable reproduction power [mW] | 0.34 | 0.38 | 0.38 | 0.38 | 0.38 | 0.38 | 0.38 | 0.38 |
| Average initial jitter [%] | 7.95 | 6.98 | 6.89 | 6.97 | 7.11 | 7.58 | 8.87 | 9.92 |

Fig. 7

| Sample No. | 2-v1 | 2-v11 | 2-v12 | 2-v13 | 2-v14 | 2-v15 | 2-v5 | 2-v51 | 2-v52 | 2-v53 | 2-v54 | 2-v55 |
|---|---|---|---|---|---|---|---|---|---|---|---|---|
| Ge [%] | 3.4 | 3.4 | 3.4 | 3.4 | 3.4 | 3.4 | 3.4 | 3.4 | 3.4 | 3.4 | 3.4 | 3.4 |
| Sb [%] | 72.7 | 72.3 | 71.9 | 71.1 | 70.4 | 69.6 | 70.0 | 69.6 | 69.3 | 68.5 | 67.7 | 67.0 |
| Te [%] | 23.4 | 23.3 | 23.2 | 23.0 | 22.7 | 22.5 | 22.6 | 22.5 | 22.3 | 22.1 | 21.9 | 21.6 |
| Ti [%] | 0.5 | 0.5 | 0.5 | 0.5 | 0.5 | 0.5 | 4.0 | 4.0 | 4.0 | 4.0 | 4.0 | 4.0 |
| In [%] | 0.0 | 0.5 | 1.0 | 2.0 | 3.0 | 4.0 | 0.0 | 0.5 | 1.0 | 2.0 | 3.0 | 4.0 |
| Sb/Te | 3.1 | 3.1 | 3.1 | 3.1 | 3.1 | 3.1 | 3.1 | 3.1 | 3.1 | 3.1 | 3.1 | 3.1 |
| Average initial jitter [%] | 6.98 | 6.91 | 6.83 | 6.86 | 6.89 | 7.02 | 7.58 | 7.48 | 7.34 | 7.35 | 7.41 | 7.66 |
| Jitter after second time recording [%] | 8.05 | 7.11 | 7.04 | 7.08 | 7.17 | 7.21 | 8.74 | 7.69 | 7.54 | 7.49 | 7.57 | 7.94 |
| Rise of jitter [%] | 1.07 | 0.20 | 0.21 | 0.22 | 0.28 | 0.19 | 1.16 | 0.21 | 0.20 | 0.14 | 0.16 | 0.28 |
| Durable reproduction power [mW] | 0.38 | 0.38 | 0.38 | 0.38 | 0.38 | 0.33 | 0.38 | 0.38 | 0.38 | 0.38 | 0.38 | 0.33 |
| Judgement | | Y | Y | Y | Y | N | | Y | Y | Y | Y | N |

Fig. 8

|  | Sample No. | | |
| --- | --- | --- | --- |
|  | 2 | 2 – v1 | 2 – v11 |
| Ge [%] | 3.4 | 3.4 | 3.4 |
| Sb [%] | 72.9 | 72.7 | 72.3 |
| Te [%] | 23.7 | 23.4 | 23.3 |
| Ti [%] | 0.0 | 0.5 | 0.5 |
| In [%] | 0.0 | 0.0 | 0.5 |
| Average initial jitter [%] | 7.95 | 6.98 | 6.91 |
| Jitter after second time recording [%] | 9.02 | 8.02 | 7.11 |
| Rise of jitter [%] | 1.07 | 1.04 | 0.20 |
| Durable reproduction power [mW] | 0.34 | 0.38 | 0.38 |

Fig. 9

| | Sample No. | | | | | | | |
|---|---|---|---|---|---|---|---|---|
| | 4 | 4–v1 | 4–v2 | 4–v3 | 4–v4 | 4–v5 | 4–v6 | 4–v7 |
| Ge [%] | 4.3 | 4.3 | 4.3 | 4.3 | 4.3 | 4.3 | 4.3 | 4.3 |
| Sb [%] | 65.1 | 64.5 | 64.2 | 63.5 | 62.8 | 62.1 | 61.4 | 60.8 |
| Te [%] | 30.6 | 30.7 | 30.5 | 30.2 | 29.9 | 29.6 | 29.3 | 28.9 |
| Ti [%] | 0.0 | 0.5 | 1.0 | 2.0 | 3.0 | 4.0 | 5.0 | 6.0 |
| Sb/Te | 2.1 | 2.1 | 2.1 | 2.1 | 2.1 | 2.1 | 2.1 | 2.1 |
| Durable reproduction power [mW] | 0.34 | 0.38 | 0.38 | 0.38 | 0.38 | 0.38 | 0.38 | 0.38 |
| Average initial jitter [%] | 8.52 | 7.48 | 7.14 | 7.08 | 7.22 | 7.76 | 9.04 | 10.12 |

Fig. 10

| | Sample No. | | | | | | | | | | | | | |
|---|---|---|---|---|---|---|---|---|---|---|---|---|---|---|
| | 4-v1 | 4-v11 | 4-v12 | 4-v13 | 4-v14 | 4-v15 | 4-v5 | 4-v51 | 4-v52 | 4-v53 | 4-v54 | 4-v55 |
| Ge [%] | 4.3 | 4.3 | 4.3 | 4.3 | 4.3 | 4.3 | 4.3 | 4.3 | 4.3 | 4.3 | 4.3 | 4.3 |
| Sb [%] | 64.5 | 64.2 | 63.8 | 63.1 | 62.5 | 61.8 | 62.1 | 61.8 | 61.4 | 60.8 | 60.1 | 59.4 |
| Te [%] | 30.7 | 30.5 | 30.4 | 30.1 | 29.7 | 29.4 | 29.6 | 29.4 | 29.3 | 28.9 | 28.6 | 28.3 |
| Ti [%] | 0.5 | 0.5 | 0.5 | 0.5 | 0.5 | 0.5 | 4.0 | 4.0 | 4.0 | 4.0 | 4.0 | 4.0 |
| In [%] | 0.0 | 0.5 | 1.0 | 2.0 | 3.0 | 4.0 | 0.0 | 0.5 | 1.0 | 2.0 | 3.0 | 4.0 |
| Sb/Te | 2.1 | 2.1 | 2.1 | 2.1 | 2.1 | 2.1 | 2.1 | 2.1 | 2.1 | 2.1 | 2.1 | 2.1 |
| Average initial jitter [%] | 7.48 | 7.45 | 7.44 | 7.46 | 7.45 | 7.62 | 7.76 | 7.68 | 7.72 | 7.7 | 7.74 | 7.91 |
| Jitter after second time recording [%] | 8.62 | 7.67 | 7.61 | 7.64 | 7.62 | 7.88 | 8.83 | 7.91 | 7.98 | 7.92 | 7.95 | 8.19 |
| Rise of jitter [%] | 1.14 | 0.22 | 0.17 | 0.18 | 0.17 | 0.26 | 1.07 | 0.23 | 0.26 | 0.22 | 0.21 | 0.28 |
| Durable reproduction power [mW] | 0.38 | 0.38 | 0.38 | 0.38 | 0.38 | 0.34 | 0.38 | 0.38 | 0.38 | 0.38 | 0.38 | 0.34 |
| Judgement | | Y | Y | Y | Y | N | | Y | Y | Y | Y | N |

Fig. 11

| | Sample No. | | | | | | | |
|---|---|---|---|---|---|---|---|---|
| | 7 | 7-v1 | 7-v2 | 7-v3 | 7-v4 | 7-v5 | 7-v6 | 7-v7 |
| Ge [%] | 4.6 | 4.6 | 4.6 | 4.6 | 4.6 | 4.6 | 4.6 | 4.6 |
| Sb [%] | 76.2 | 75.9 | 75.5 | 74.7 | 73.9 | 73.1 | 72.3 | 71.5 |
| Te [%] | 19.2 | 19.0 | 18.9 | 18.7 | 18.5 | 18.3 | 18.1 | 17.9 |
| Ti [%] | 0.0 | 0.5 | 1.0 | 2.0 | 3.0 | 4.0 | 5.0 | 6.0 |
| Sb/Te | 4.0 | 4.0 | 4.0 | 4.0 | 4.0 | 4.0 | 4.0 | 4.0 |
| Durable reproduction power [mW] | 0.34 | 0.38 | 0.38 | 0.38 | 0.38 | 0.38 | 0.38 | 0.38 |
| Average initial jitter [%] | 8.28 | 7.42 | 7.02 | 6.82 | 6.98 | 7.36 | 8.51 | 9.63 |

Fig. 12

| | Sample No. | | | | | | | | | | | | | |
|---|---|---|---|---|---|---|---|---|---|---|---|---|---|---|
| | 7-v1 | 7-v11 | 7-v12 | 7-v13 | 7-v14 | 7-v15 | 7-v5 | 7-v51 | 7-v52 | 7-v53 | 7-v54 | 7-v55 |
| Ge [%] | 4.6 | 4.6 | 4.6 | 4.6 | 4.6 | 4.6 | 4.6 | 4.6 | 4.6 | 4.6 | 4.6 | 4.6 |
| Sb [%] | 75.9 | 75.5 | 75.1 | 74.3 | 73.5 | 72.7 | 73.1 | 72.7 | 72.3 | 71.5 | 70.7 | 69.9 |
| Te [%] | 19.0 | 18.9 | 18.8 | 18.6 | 18.4 | 18.2 | 18.3 | 18.2 | 18.1 | 17.9 | 17.7 | 17.5 |
| Ti [%] | 0.5 | 0.5 | 0.5 | 0.5 | 0.5 | 0.5 | 4.0 | 4.0 | 4.0 | 4.0 | 4.0 | 4.0 |
| In [%] | 0.0 | 0.5 | 1.0 | 2.0 | 3.0 | 4.0 | 0.0 | 0.5 | 1.0 | 2.0 | 3.0 | 4.0 |
| Sb/Te | 4 | 4 | 4 | 4 | 4 | 4 | 4 | 4 | 4 | 4 | 4 | 4 |
| Average initial jitter [%] | 7.42 | 7.39 | 7.4 | 7.37 | 7.39 | 7.51 | 7.36 | 7.34 | 7.35 | 7.33 | 7.31 | 7.43 |
| Jitter after second time recording [%] | 8.46 | 7.63 | 7.62 | 7.58 | 7.61 | 7.78 | 8.45 | 7.62 | 7.61 | 7.51 | 7.54 | 7.71 |
| Rise of jitter [%] | 1.04 | 0.24 | 0.22 | 0.21 | 0.22 | 0.27 | 1.09 | 0.28 | 0.26 | 0.18 | 0.23 | 0.28 |
| Durable reproduction power [mW] | 0.38 | 0.38 | 0.38 | 0.38 | 0.38 | 0.34 | 0.38 | 0.38 | 0.38 | 0.38 | 0.38 | 0.34 |
| Judgement | | Y | Y | Y | Y | N | | Y | Y | Y | Y | N |

Fig. 13

| | Sample No. | | | | | | | |
|---|---|---|---|---|---|---|---|---|
| | 17 | 17-v1 | 17-v2 | 17-v3 | 17-v4 | 17-v5 | 17-v6 | 17-v7 |
| Ge [%] | 14.5 | 14.5 | 14.5 | 14.5 | 14.5 | 14.5 | 14.5 | 14.5 |
| Sb [%] | 65.3 | 64.8 | 64.4 | 63.6 | 62.9 | 62.1 | 61.3 | 60.6 |
| Te [%] | 20.2 | 20.2 | 20.1 | 19.9 | 19.6 | 19.4 | 19.2 | 18.9 |
| Ti [%] | 0.0 | 0.5 | 1.0 | 2.0 | 3.0 | 4.0 | 5.0 | 6.0 |
| Sb/Te | 3.2 | 3.2 | 3.2 | 3.2 | 3.2 | 3.2 | 3.2 | 3.2 |
| Durable reproduction power [mW] | 0.36 | 0.4 | 0.4 | 0.4 | 0.4 | 0.4 | 0.4 | 0.4 |
| Average initial jitter [%] | 8.02 | 7.14 | 7.05 | 7.02 | 7.16 | 7.28 | 8.55 | 9.78 |

Fig. 14

| | Sample No. | | | | | | | | | | | | | |
|---|---|---|---|---|---|---|---|---|---|---|---|---|---|---|
| | 17-v1 | 17-v11 | 17-v12 | 17-v13 | 17-v14 | 17-v15 | 17-v5 | 17-v51 | 17-v52 | 17-v53 | 17-v54 | 17-v55 |
| Ge [%] | 14.5 | 14.5 | 14.5 | 14.5 | 14.5 | 14.5 | 14.5 | 14.5 | 14.5 | 14.5 | 14.5 | 14.5 |
| Sb [%] | 64.8 | 64.4 | 64.0 | 63.2 | 62.5 | 61.7 | 62.1 | 61.7 | 61.3 | 60.6 | 59.8 | 59.0 |
| Te [%] | 20.2 | 20.1 | 20.0 | 19.8 | 19.5 | 19.3 | 19.4 | 19.3 | 19.2 | 18.9 | 18.7 | 18.5 |
| Ti [%] | 0.5 | 0.5 | 0.5 | 0.5 | 0.5 | 0.5 | 4.0 | 4.0 | 4.0 | 4.0 | 4.0 | 4.0 |
| In [%] | 0.0 | 0.5 | 1.0 | 2.0 | 3.0 | 4.0 | 0.0 | 0.5 | 1.0 | 2.0 | 3.0 | 4.0 |
| Sb/Te | 3.2 | 3.2 | 3.2 | 3.2 | 3.2 | 3.2 | 3.2 | 3.2 | 3.2 | 3.2 | 3.2 | 3.2 |
| Average initial jitter [%] | 7.14 | 7.09 | 7.12 | 7.10 | 7.14 | 7.18 | 7.28 | 7.25 | 7.26 | 7.24 | 7.27 | 7.39 |
| Jitter after second time recording [%] | 8.22 | 7.31 | 7.36 | 7.33 | 7.41 | 7.45 | 8.52 | 7.47 | 7.49 | 7.51 | 7.54 | 7.66 |
| Rise of jitter [%] | 1.08 | 0.22 | 0.24 | 0.23 | 0.27 | 0.27 | 1.24 | 0.22 | 0.23 | 0.27 | 0.27 | 0.27 |
| Durable reproduction power [mW] | 0.4 | 0.4 | 0.4 | 0.4 | 0.4 | 0.35 | 0.4 | 0.4 | 0.4 | 0.4 | 0.4 | 0.35 |
| Judgement | | Y | Y | Y | Y | N | | Y | Y | Y | Y | N |

Fig. 15

| | Sample No. | | | | | | |
|---|---|---|---|---|---|---|---|
| | 2-v20 | 2-v21 | 2-v22 | 2-v23 | 2-v24 | 2-v25 | 2-v26 |
| Ge [%] | 3.4 | 3.4 | 3.4 | 3.4 | 3.4 | 3.4 | 3.4 |
| Sb [%] | 72.9 | 72.6 | 72.4 | 72.1 | 71.3 | 70.5 | 69.8 |
| Te [%] | 23.4 | 23.4 | 23.4 | 23.2 | 23.0 | 22.8 | 22.5 |
| Ti [%] | 0.3 | 0.3 | 0.3 | 0.3 | 0.3 | 0.3 | 0.3 |
| In [%] | 0.0 | 0.3 | 0.5 | 1.0 | 2.0 | 3.0 | 4.0 |
| Sb/Te | 3.1 | 3.1 | 3.1 | 3.1 | 3.1 | 3.1 | 3.1 |
| Average initial jitter [%] | 6.98 | 6.95 | 6.91 | 6.83 | 6.86 | 6.89 | 7.02 |
| Jitter after second time recording [%] | 8.05 | 7.16 | 7.11 | 7.04 | 7.08 | 7.17 | 7.21 |
| Rise of jitter [%] | 1.07 | 0.21 | 0.20 | 0.21 | 0.22 | 0.28 | 0.19 |
| Durable reproduction power [mW] | 0.38 | 0.38 | 0.38 | 0.38 | 0.38 | 0.38 | 0.33 |
| Judgement | | Y | Y | Y | Y | Y | N |

Fig. 16

| | Sample No. | | | | | | |
|---|---|---|---|---|---|---|---|
| | 4-v20 | 4-v21 | 4-v22 | 4-v23 | 4-v24 | 4-v25 | 4-v26 |
| Ge [%] | 4.3 | 4.3 | 4.3 | 4.3 | 4.3 | 4.3 | 4.3 |
| Sb [%] | 64.5 | 64.4 | 64.3 | 63.9 | 63.3 | 62.6 | 61.9 |
| Te [%] | 30.7 | 30.7 | 30.6 | 30.5 | 30.1 | 29.8 | 29.5 |
| Ti [%] | 0.3 | 0.3 | 0.3 | 0.3 | 0.3 | 0.3 | 0.3 |
| In [%] | 0.0 | 0.3 | 0.5 | 1.0 | 2.0 | 3.0 | 4.0 |
| Sb/Te | 2.1 | 2.1 | 2.1 | 2.1 | 2.1 | 2.1 | 2.1 |
| Average initial jitter [%] | 7.48 | 7.46 | 7.45 | 7.44 | 7.46 | 7.45 | 7.62 |
| Jitter after second time recording [%] | 8.62 | 7.69 | 7.67 | 7.61 | 7.64 | 7.62 | 7.88 |
| Rise of jitter [%] | 1.14 | 0.23 | 0.22 | 0.17 | 0.18 | 0.17 | 0.26 |
| Durable reproduction power [mW] | 0.38 | 0.38 | 0.38 | 0.38 | 0.38 | 0.38 | 0.34 |
| Judgement | | Y | Y | Y | Y | Y | N |

Fig. 17

| | Sample No. | | | | | | |
|---|---|---|---|---|---|---|---|
| | 7-v20 | 7-v21 | 7-v22 | 7-v23 | 7-v24 | 7-v25 | 7-v26 |
| Ge [%] | 4.6 | 4.6 | 4.6 | 4.6 | 4.6 | 4.6 | 4.6 |
| Sb [%] | 75.9 | 75.8 | 75.7 | 75.3 | 74.5 | 73.7 | 72.9 |
| Te [%] | 19.0 | 19.0 | 18.9 | 18.8 | 18.6 | 18.4 | 18.2 |
| Ti [%] | 0.3 | 0.3 | 0.3 | 0.3 | 0.3 | 0.3 | 0.3 |
| In [%] | 0.0 | 0.3 | 0.5 | 1.0 | 2.0 | 3.0 | 4.0 |
| Sb/Te | 4 | 4 | 4 | 4 | 4 | 4 | 4 |
| Average initial jitter [%] | 7.42 | 7.4 | 7.39 | 7.4 | 7.37 | 7.39 | 7.51 |
| Jitter after second time recording [%] | 8.46 | 7.63 | 7.63 | 7.62 | 7.58 | 7.61 | 7.78 |
| Rise of jitter [%] | 1.04 | 0.23 | 0.24 | 0.22 | 0.21 | 0.22 | 0.27 |
| Durable reproduction power [mW] | 0.38 | 0.38 | 0.38 | 0.38 | 0.38 | 0.38 | 0.34 |
| Judgement | | Y | Y | Y | Y | Y | N |

Fig. 18

| | Sample No. | | | | | | |
|---|---|---|---|---|---|---|---|
| | 17-v20 | 17-v21 | 17-v22 | 17-v23 | 17-v24 | 17-v25 | 17-v26 |
| Ge [%] | 14.5 | 14.5 | 14.5 | 14.5 | 14.5 | 14.5 | 14.5 |
| Sb [%] | 65.0 | 64.7 | 64.5 | 64.2 | 63.4 | 62.6 | 61.9 |
| Te [%] | 20.2 | 20.2 | 20.2 | 20.0 | 19.8 | 19.6 | 19.3 |
| Ti [%] | 0.3 | 0.3 | 0.3 | 0.3 | 0.3 | 0.3 | 0.3 |
| In [%] | 0.0 | 0.3 | 0.5 | 1.0 | 2.0 | 3.0 | 4.0 |
| Sb/Te | 3.2 | 3.2 | 3.2 | 3.2 | 3.2 | 3.2 | 3.2 |
| Average initial jitter [%] | 7.14 | 7.11 | 7.09 | 7.12 | 7.10 | 7.14 | 7.18 |
| Jitter after second time recording [%] | 8.22 | 7.34 | 7.31 | 7.36 | 7.33 | 7.41 | 7.45 |
| Rise of jitter [%] | 1.08 | 0.23 | 0.22 | 0.24 | 0.23 | 0.27 | 0.27 |
| Durable reproduction power [mW] | 0.4 | 0.4 | 0.4 | 0.4 | 0.4 | 0.4 | 0.35 |
| Judgement | | Y | Y | Y | Y | Y | N |

Fig. 19

| | Sample No. 2-v11 | Additive element | | | |
|---|---|---|---|---|---|
| | | Fe | Al | Si | |
| Ge [%] | 3.4 | 3.4 | 3.4 | 3.4 | |
| Sb [%] | 72.3 | 71.5 | 71.5 | 71.5 | |
| Te [%] | 23.3 | 23.1 | 23.1 | 23.1 | |
| Ti [%] | 0.5 | 0.5 | 0.5 | 0.5 | |
| In [%] | 0.5 | 0.5 | 0.5 | 0.5 | |
| Amount of additive element [%] | 0.0 | 1 | 1 | 1 | |
| Sb/Te | 3.1 | 3.1 | 3.1 | 3.1 | |
| Average initial jitter [%] | 6.91 | 6.94 | 6.92 | 6.93 | |
| Jitter after second time recording [%] | 7.11 | 7.17 | 7.12 | 7.14 | |
| Rise of jitter [%] | 0.20 | 0.23 | 0.20 | 0.21 | |
| Durable reproduction power [mW] | 0.38 | 0.38 | 0.38 | 0.38 | |
| Judgement | | Y | Y | Y | |

Fig. 20

|  | Sample No. 2-v11 | Additive element | | | |
|---|---|---|---|---|---|
|  |  | Fe | Al | Si |  |
| Ge [%] | 3.4 | 3.4 | 3.4 | 3.4 |  |
| Sb [%] | 72.3 | 71.5 | 71.5 | 71.5 |  |
| Te [%] | 23.3 | 23.0 | 23.0 | 23.0 |  |
| Ti [%] | 0.5 | 0.5 | 0.5 | 0.5 |  |
| In [%] | 0.5 | 0.5 | 0.5 | 0.5 |  |
| Amount of additive element [%] | 0.0 | 1.1 | 1.1 | 1.1 |  |
| Sb/Te | 3.1 | 3.1 | 3.1 | 3.1 |  |
| Average initial jitter [%] | 6.91 | 7.52 | 7.24 | 7.26 |  |
| Jitter after second time recording [%] | 7.11 | 7.98 | 7.67 | 7.68 |  |
| Rise of jitter [%] | 0.20 | 0.46 | 0.43 | 0.42 |  |
| Durable reproduction power [mW] | 0.38 | 0.38 | 0.38 | 0.38 |  |
| Judgement |  | Y | Y | Y |  |

Fig. 21

|  | Sample No. 2-v11 | Additive element | | | |
|---|---|---|---|---|---|
|  |  | Fe | Al | Si | |
| Ge [%] | 3.4 | 3.4 | 3.4 | 3.4 | |
| Sb [%] | 72.3 | 71.4 | 71.4 | 71.4 | |
| Te [%] | 23.3 | 23.0 | 23.0 | 23.0 | |
| Ti [%] | 0.5 | 0.5 | 0.5 | 0.5 | |
| In [%] | 0.5 | 0.5 | 0.5 | 0.5 | |
| Amount of additive element [%] | 0.0 | 1.2 | 1.2 | 1.2 | |
| Sb/Te | 3.1 | 3.1 | 3.1 | 3.1 | |
| Average initial jitter [%] | 6.91 | 8.15 | 7.48 | 7.34 | |
| Jitter after second time recording [%] | 7.11 | 8.87 | 8.14 | 8.04 | |
| Rise of jitter [%] | 0.20 | 0.72 | 0.66 | 0.70 | |
| Durable reproduction power [mW] | 0.38 | 0.38 | 0.38 | 0.38 | |
| Judgement |  | N | N | N | |

Fig. 22

OPTICAL INFORMATION RECORDING MEDIUM

BACKGROUND OF THE INVENTION

1. Field of the Invention

The present invention relates to an optical information recording medium, particularly, relates to an optical disc, wherein recording or erasing information is conducted by changing configuration of atoms constituting a recording layer of the optical information recording medium by irradiating light.

2. Description of the Related Art

A so-called phase-change type optical information recording medium has been well known as one of optical memory mediums, which is enabled to record, reproduce or erase information by irradiating a laser beam. Such a phase-change type optical information recording medium uses transition between crystal and amorphous or transition between two crystalline phases of crystal 1 and crystal 2.

A thin film of chalcogen system alloy is commonly used as a material for a recording layer of a phase-change type optical information recording medium. A thin film of GeSbTe system alloy or AgInSbTe system alloy among the chalcogen system alloys has been practically applied for an optical information recording medium as a rewritable optical disc.

A recording principle of such a rewritable optical disc is as follows. A recording layer immediately after being filmed is in an amorphous state and low in reflectivity. Therefore, the recording layer of the optical disc is heated by irradiating a laser beam first, and then whole area of the recording layer is conducted to be a crystalline state that is high in reflectivity. In other words, the optical disc is initialized. Generally, this initialization is conducted by irradiating a laser beam converged with a diameter of some μm to 100 μm on the optical disc that is rotating.

Irradiating a laser beam on the initialized optical disc locally melts a part of the recording layer. Then the optical disc is cooled down rapidly. A phase of the part of the recording layer results in changing into an amorphous state. Accordingly, optical characteristics such as reflectivity, transmissivity, and birefringence index of the recording layer change in response to the change of phase, and resulting in recording information.

Reproduction is conducted by detecting reflectivity difference between crystal and amorphous or phase difference between them by irradiating a weaker laser beam than that for recording.

Further, rewriting is conducted by overwriting on a prerecorded record mark without processing through an erasing process by injecting recording peak power, which is superimposed on erasing power in low energy that causes crystallization, into the recording layer.

A laser device having a relatively high output is essential for initialization. In such a laser device having a high output, a beam diameter is made finer, so that beam density increases even in lower laser power. However, until now, it takes extremely long time to initialize an optical disc by scanning with a laser beam having a beam diameter of some μm to 100 μm.

Accordingly, a GeSbTe system material has been developed which enables initialization by lower laser power and is made by combining GeTe and $Ge_2Sb_3$ that are not a eutectic system. Then an AgInSbTe system material has been developed after the development of the GeSbTe system material. Initializing the AgInSbTe system material requires stronger laser power than laser power for initializing GeSbTe system materials.

A laser beam has been advanced to have a shorter wavelength and higher output. Consequently, an initializing apparatus installed with a laser device in high power has been introduced since the above-mentioned GeSbTe system and AgInSbTe system materials were developed. In this connection, a GeSbTe system material of eutectic system, which was hardly initialized in the past, has now been developed.

In the case of the GeSbTe system materials except for the materials practically applied, it is commonly known that a eutectic composition of Sb and Te transforms its crystalline state to amorphous state or vice versa.

The Japanese Patent Application Laid-open Publication Nos. 1-115685/1989, 1-251342/1989, and 1-303643/1989 disclose the range of composition such as adding a third element, particularly, adding Ge into a eutectic composition of Sb and Te that is composed of 70 atomic percent of Sb and 30 atomic percent of Te.

Further, the Japanese Patent Application Laid-open Publication No. 2000-313170 discloses that In (indium) is added to a eutectic composition for improving characteristics.

With respect to a recording method of an optical disc that is made from a phase change material, recording has been conducted by using a red laser beam having a wavelength of around 650 nm that has been used for recording DVD-ROM discs, or by using a laser beam having a wavelength being longer than 650 nm. Recently, however, a semiconductor laser element emitting light having a wavelength of around 400 nm has been introduced into the market.

Further, a numerical aperture (hereinafter referred to as NA) of an objective lens has been increased, and resulted in enabling to converge a light beam furthermore.

Combining a laser beam having a shorter wavelength and an objective lens having a higher NA makes a spot diameter of a laser beam smaller and results in increasing recording density of an optical disc. Consequently, an optical disc system using a blue laser beam has been studied.

Recently, specifications for an optical disc, a so-called Blu-ray Disc, which is recorded or reproduced by using a blue-violet laser beam having a wavelength of 405 nm and an objective lens having a NA of 0.85, have been formulated. Such a Blu-ray Disc draws public attention as next generation of optical discs.

In this connection, it is demanded for an optical disc enabling to realize high-density recording by using a blue laser beam, wherein a recording density conducted by a blue laser beam is higher than a recording density conducted by a conventional red laser beam, that the optical disc is not only capable of a blue laser beam having a shorter wavelength but also able to be recorded sufficiently even by a short pulse width, and further rewritable.

With respect to GeSbTe system materials in the neighborhood of eutectic composition out of conventional materials, it has been experimentally confirmed that the GeSbTe system materials enabled to be recorded and reproduced to some extent by using an optical disc system equipped with a blue laser beam.

Further, in order to improve recording and reproducing characteristics, it was also experimentally confirmed that controlling a crystallizing speed by adjusting balance of each amount of Sb and Te in compositional elements of the GeSbTe system materials could change a linear velocity corresponding to recording.

Furthermore, an amount of Ge significantly affects stability of recording materials. If the amount of Ge is within a moderate range, reproduction durability against a blue laser beam having a small beam diameter and a high energy density can be improved.

However, in order to perform recording in higher density, improving recording and reproducing characteristics furthermore is essential. In other words, both of increasing reproduction power and reducing jitter are essential to recording in higher density. On the contrary, in a case of an optical disc made from GeSbTe system materials as a recording material, there exists a limit in characteristics with respect to increasing reproduction power and reducing jitter.

By the constitutional compositions disclosed in the above-mentioned Japanese Patent Application Laid-open Publications, it is impossible to obtain such an optical information recording medium to be realized by the present invention that exhibits sufficient recording and reproducing characteristics and contrast and further higher durability against reproduction light.

SUMMARY OF THE INVENTION

Accordingly, in consideration of the above-mentioned problems of the prior arts, an object of the present invention is to provide an optical-information recording medium, which exhibits excellent recording and reproducing characteristics conducted by an optical disc system installed with a blue laser beam, higher durability against reproduction light, higher contrast, and less deterioration by rewriting.

In order to achieve the above object, the present invention provides, according to an aspect thereof, an optical information recording medium for recording information comprising a substrate; and a phase-change type optical recording layer provided as one of a plurality of layers formed on the substrate, the phase-change type optical recording layer further containing at least Ti, In, Ge, Sb and Te, when defining each content amount of the Ti, In, Ge, Sb and Te as v, w, x, y and z in atomic percent respectively, each content amount of v, w, x, y and z in atomic percent satisfying following relations: $0.3 \leq v \leq 4$, $0.3 \leq w \leq 3$, $3.4 \leq x \leq 14.5$, $2.1 \leq y/z \leq 4$ and $v+w+x+y+z \leq 100$.

Other object and further features of the present invention will be apparent from the following detailed description when read in conjunction with the accompanying drawings.

BRIEF DESCRIPTION OF DRAWINGS

FIG. 4 is a summary table exhibiting deteriorated reproduction and jitter with respect to 18 samples of optical discs according to the present invention.

FIG. 5 is a table exhibiting recording power and strategy as recording conditions according to each embodiment of the present invention.

FIG. 6 is a comparison table exhibiting a C/N at each of "immediately after" and "5 minutes after" still mode reproduction is started with respect to each sample according to each embodiment of the present invention.

FIG. 7 is a table exhibiting constitutional composition, durability against reproduction light, and average initial jitter with respect to each optical disc of sample Nos. "2" and "2-v1" to "2-v7" according to an embodiment one of the present invention.

FIG. 8 is a comparison table exhibiting constitutional composition, jitter, and durability against reproduction light with respect to each sample according to the embodiment one of the present invention.

FIG. 9 is a comparison table among a sample Nos. 2, "2-v1" and "2-v11" according to the embodiment one showing constitutional composition, average initial jitter, jitter after. second time recording and durable reproduction power.

FIG. 10 is a table exhibiting constitutional composition, durability against reproduction light, and average initial jitter with respect to each optical disc of sample Nos. "4" and "4-v1" to "4-v7" according to an embodiment two of the present invention.

FIG. 11 is a table exhibiting constitutional composition, jitter, and durability against reproduction light with respect to each sample according to the embodiment two of the present invention.

FIG. 12 is a table exhibiting constitutional composition, durability against reproduction light, and average initial jitter with respect to each optical disc of sample Nos. "7" and "7-v1" to "7-v7" according to an embodiment three of the present invention.

FIG. 13 is a table exhibiting constitutional composition, jitter, and durability against reproduction light with respect to each sample according to the embodiment three of the present invention.

FIG. 14 is a table exhibiting constitutional composition, durability against reproduction light, and average initial jitter with respect to each optical disc of sample Nos. "17" and "17-v1" to "17-v7" according to an embodiment four of the present invention.

FIG. 15 is a table exhibiting constitutional composition, jitter, and durability against reproduction light with respect to each sample according to the embodiment four of the present invention.

FIG. 16 is a table exhibiting constitutional composition, jitter, and durability against reproduction light with respect to each optical disc of sample Nos. "2-v20" to "2-v26" according to an embodiment five of the present invention.

FIG. 17 is a table exhibiting constitutional composition, jitter, and durability against reproduction light with respect to each optical disc of sample Nos. "4-v20" to "4-v26" according to an embodiment six of the present invention.

FIG. 18 is a table exhibiting constitutional composition, jitter, and durability against reproduction light with respect to each optical disc of sample Nos. "7-v20" to "7-v26" according to an embodiment seven of the present invention.

FIG. 19 is a table exhibiting constitutional composition, jitter, and durability against reproduction light with respect to each optical disc of sample Nos. "17-v20" to "17-v26" according to an embodiment six of the present invention.

FIG. 20 is a table exhibiting constitutional composition, jitter, and durability against reproduction light when added with 1% of an additive element with respect to the sample No. "2-v11" of the embodiment one of the present invention.

FIG. 21 is a table exhibiting constitutional composition, jitter, and durability against reproduction light when added with 1.1% of an additive element with respect to the sample No. "2-v11" of the embodiment one of the present invention.

FIG. 22 is a table exhibiting constitutional composition, jitter, and durability against reproduction light when added with 1.2% of an additive element with respect to the sample No. "2-v11" of the embodiment one of the present invention.

DETAILED DESCRIPTION OF THE PREFERRED EMBODIMENTS

The present invention can provide an optical information recording medium that is improved in recording and reproducing characteristics by means of an optical disc system installed with a blue laser beam, capable of withstanding reproduction light in higher output, capable of exhibiting higher contrast, capable of being recorded in lower jitter, and capable of suppressing an increase in jitter even by rewriting a small number of times, wherein these features have never been achieved by the conventional GeSbTe system recording materials.

With referring to accompanied drawings, a preferred embodiment of an optical information recording medium according to the present invention is described next. Generic descriptions common to all embodiments are explained first. An embodiment mentioned below is a preferable example of the present invention. Therefore, it should be understood that scope of the present invention is not limited to the embodiment mentioned below unless otherwise specified in the specification although various limitations that are technically preferable are given.

Figure 1:
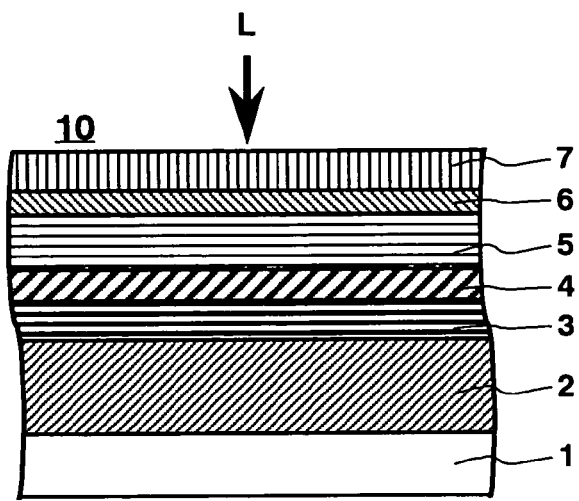
FIG. 1 is a cross sectional view showing a fundamental constitution of an optical information recording medium (optical disc) according to an embodiment of the present invention.

FIG. 1 is a cross sectional view showing a fundamental constitution of an optical information recording medium according to an embodiment of the present invention.

Figure 2:
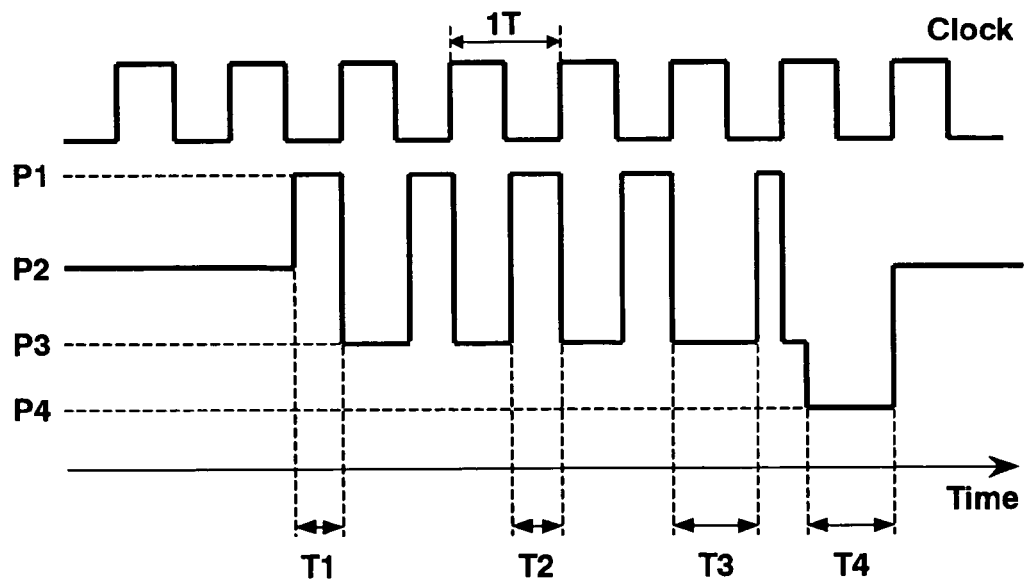
FIG. 2 shows a pattern of recording strategy according to the present invention.

FIG. 2 shows a pattern of recording strategy according to the present invention.

Figure 3:
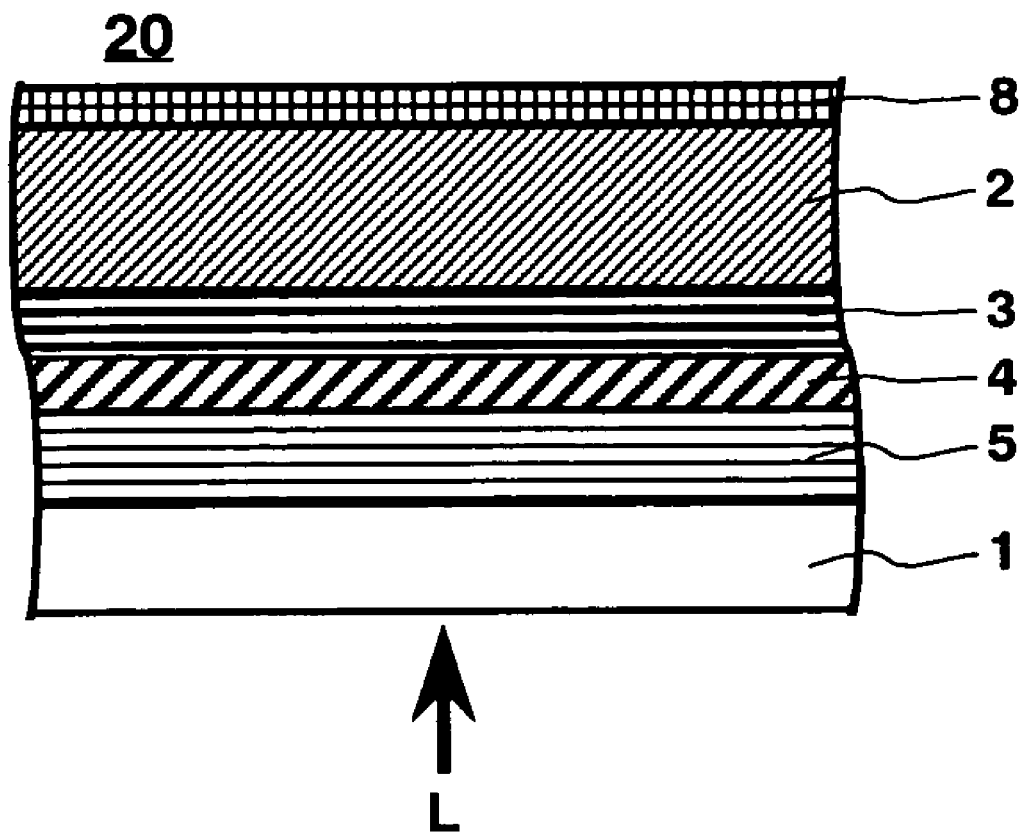
FIG. 3 is a cross sectional view showing a fundamental constitution of another optical disc according to another embodiment of the present invention.

FIG. 3 is a cross sectional view showing a fundamental constitution of another optical information recording medium according to another embodiment of the present invention.

In FIG. 1, an optical information recording medium (hereinafter referred to as optical disc) 10 according to an embodiment of the present invention is composed of a substrate 1, a reflective layer 2 formed on the substrate 1, a first protective layer 3 formed on the reflective layer 2, a recording layer 4 formed on the first protective layer 3, a second protective layer 5 formed on the recording layer 4, an adhesive layer 6 formed on the second protective layer 5, and a cover sheet layer 7. They are sequentially laminated. The optical disc 10 according to the embodiment of the present invention is provided with the recording layer 4 above the substrate 1. Recording information in or erasing information from the optical disc 10 is conducted by irradiating a laser beam L on the recording layer 4 through the cover sheet layer 7 opposite to the substrate 1 so as to change configuration of atoms constituting the recording layer 4.

The laser beam L enters the optical disc 10 through the cover sheet layer 7 hereupon. However, the laser beam L can be entered the substrate 1 side without providing the cover sheet layer 7. In a case that reflectivity is sufficiently high, a constitution excluding the reflective layer 2 can be applicable.

FIG. 3 is a cross sectional view of another optical disc according to another embodiment of the present invention, wherein a laser beam is irradiated on an opposite side in comparison with the optical disc 10 shown in FIG. 1. In FIG. 3, an optical disc 20 is composed of a substrate 1, a second protective layer 5 formed on the substrate 1, a recording layer 4 formed on the second protective layer 5, a first protective layer 3 formed on the recording layer 4, a reflective layer 2 formed on the first protective layer 3, and a protective coat layer 8. They are sequentially laminated.

With respect to a material for the substrate 1 of the optical discs 10 and 20, any of glass, plastic, and glass provided with light curable resin thereon can be used. However, a plastic is preferable for the substrate 1 in consideration of productivity including cost, particularly polycarbonate resin is most preferable.

With respect to a material for the reflective layer 2, there exists a metal having light reflectiveness such as Al, Au and Ag, an alloy composed of any of the metals as a main component with containing an additive element such as Ti, Cr, Pd and Cu, and a mixture of a metal such as Al, Au and Ag with a metal compound such as nitride, oxide, and chalcogenide of a metal such as Al and Si. A metal such as Al, Au and Ag, and an alloy containing the metal as a main component is high in light reflectiveness and enables to be made thermal conductivity higher, so that the metal or the alloy is preferable for the reflective layer 2. A thickness of the reflective layer 2 is more than 5 nm and less than 300 nm approximately.

By sandwiching the recording layer 4 between the first and second protective layers 3 and 5 to be a dielectric layer, the substrate 1 and the recording layer 4 can be prevented from thermal deformation that is caused by irradiation heat due to a laser beam when recording, and results in deterioration of recording characteristics.

Constituting the first and second protective layers 3 and 5 as mentioned above is effective for protecting the substrate 1 and the recording layer 4 from heat, and effective for improving a signal contrast when reproducing because of effects of optical interference.

Further, the first and second protective layers 3 and 5 are effective for activating crystallization of the recording layer 4, and resulting in improving an erasing ratio.

An inorganic thin film of $ZnS$—$SiO_2$, $Si_3N_4$, or $Al_2O_3$ is applicable for the first and second protective layers 3 and 5.

Particularly, a thin film of a metal or an oxide of semiconductor such as Si, Ge, Al, Ti, Zr and Ta, a thin film of a metal or a nitride of semiconductor such as Si, Ge and Al, a thin film of a metal or a carbide of semiconductor such as Ti, Zr, Hf and Si, a thin film of a metal or a sulfide of semiconductor such as $ZnS$, $In_2S_3$, $TaS_4$, and $GeS_2$, and a thin film of mixture of more than two compounds listed above is desirable for the first and second protective layers 3 and 5 because it is high in heat resistance and stable chemically.

Further, a material excluding atomic diffusion is preferable for the first and second protective layers 3 and 5. The above-mentioned metals or oxide, sulfide, nitride or carbide of the semiconductors are not necessary to be stoichiometric composition. However, it is effective for them to use by controlling compositions or by mixing them in order to control a refractive index.

Furthermore, the first and second protective layers 3 and 5, which are made from the above-mentioned metals or oxide, sulfide, nitride or carbide of the above-mentioned semiconductors that are mixed with fluoride such as $MgF_3$, are preferable because residual stress of a film or layer is small. Particularly, a mixed film of $ZnS$ and $SiO_2$ is more preferable because recording sensitivity, a C/N (carrier to noise ratio) and an erase ratio is hardly deteriorated even by repeating recording and erasing a plurality of times. A thickness of the first and second protective layers 3 and 5 is 5 nm to 200 nm approximately.

More, a thickness of the first protective layer 3 is desirable to be 5 nm to 30 nm, because recording characteristics such as C/N and erase ratio are hardly deteriorated, and rewriting a plurality of times stably is possible.

On the other hand, a thickness of the second protective layer 5 is desirable to be 30 nm to 200 nm, because the second protective layer 5 is hard to be removed from the recording layer 4 or the adhesive layer 6, and further hard to generate defect such as clacking. It is also acceptable that the first and second protective layers 3 and 5 can be constituted by different compounds from each other not by an identical compound.

A thickness of the recording layer 4 is not specifically defined. However, the thickness is 3 nm to 100 nm in general. Particularly, a range of more than 3 nm and less than 30 nm is more desirable, because such a recording layer is high in recording and erasing sensitivity and enables to record and erase a plurality of times.

With respect to a light source for the optical discs 10 and 20 according to the present invention, a laser beam is preferably used, wherein a wavelength of the laser beam is within a range of 830 nm in the near infrared region and 300 nm in the ultraviolet region. A laser beam in which a wavelength of primary light is shortened by using a secondary harmonic generating element (SHG element) can also be used as a light source.

With referring to FIG. 2, a recording strategy is explained next. Recording on an optical disc 10 according to the present invention is conducted by forming an amorphous record mark in a recording layer 4 after heating the recording layer 4 by irradiating a laser beam pulse or like on the recording layer 4 in a crystalline state and cooling down rapidly.

Practically, by injecting recording peak power P1, which is superimposed on erasing power P2 in lower energy that induces crystallization to the recording layer 4, into the recording layer 4, a record mark previously recorded is overwritten without conducting an erasing process. At this moment, the recording laser pulse is divided into a plurality of pulses of which length is shorter than that of a record mark.

In this embodiment of the present invention, an optical disc 10 is recorded through the one beam overwrite method by using the Optical Disc Drive Tester: model LM330A manufactured by Shibasoku Co., Ltd. equipped with a laser diode emitting a laser beam having a wavelength of 405 nm and an optical lens or objective lens having a numerical aperture (NA) of 0.85. The Initializer: model LK201A manufactured by Shibasoku Co., Ltd. is used as an initializing apparatus.

It is experimentally confirmed that a GeSbTe system material in the neighborhood of eutectic composition can be recorded and reproduced to some extent by using an optical disc system equipped with a blue laser beam.

Further, it is also experimentally confirmed that a crystallizing speed can be controlled and a corresponding linear velocity when recording can be changed by adjusting a balance of respective amount of Sb and Te out of elements constituting a GeSbTe system material so as to improve recording and reproducing characteristics.

Furthermore, it is also experimentally confirmed that an amount of Ge significantly affects stability of a recording material and reproduction durability against a blue laser beam, which is small in beam diameter and high in energy density, can be increased if an amount of Ge is within a moderate range.

Consequently, 18 samples of optical discs are manufactured and experimented, wherein each recording layer 4 of the 18 samples is made from the GeSbTe system material. Then 12 samples are selected from the 18 samples, wherein the 12 samples satisfy conditions such that deterioration in reproduction is less than 0.2 dB and initial jitter is less than 9%. These 12 samples seem to be capable of a blue laser beam and able to be recorded sufficiently even by a short pulse width and to be rewritable in so far as a compositional amount in atomic percent of GeSbTe and a ratio of Sb/Te is within the moderate range.

Results of the experiment on the 18 samples are summarized in FIG. 4.

FIG. 4 is a table exhibiting deteriorated reproduction and jitter with respect to the 18 samples. In FIG. 4, a reference sign "Yes" in columns of "deteriorated reproduction" and "jitter" denotes that a sample satisfies either one or both of the above-mentioned conditions: deterioration in reproduction is less than 0.2 dB and initial jitter is less than 9%.

As shown in FIG. 4, these 12 samples (sample Nos. 2, 4, 5, 7–11, 14–17) satisfy both the deteriorated reproduction and the initial jitter. However, these 12 samples are not satisfactory with improving durable reproduction power or reducing jitter in order to perform recording in higher density by using a blue laser beam. In other words, an optical disc made from a GeSbTe system material as a phase-change type optical recording layer is less in contrast, because its durable reproduction power output is at most the order of 0.36 mW. Therefore, enough contrast can not be obtained. Consequently, a C/N is deteriorated and jitter fails to be reduced.

Further, jitter is apt to be deteriorated when rewriting, particularly, when second time recording is performed. This is caused by that a record mark recorded at the first time recording is not erased sufficiently, because a compositional ratio of the material is determined so as to ensure durability against reproduction light.

With respect to durability against reproduction light, "Blu-ray Disc Standard Specifications" specify that a disc should not be deteriorated by reproduction light in power of 0.30 mW when reproducing in the still mode, wherein the reproduction light is modulated by the HF modulation method.

Further, in consideration of frequency, a pulse width and a ratio of peak power to average power as parameters for modulating reproduction light, the "Blu-ray Disc Standard Specifications" standardize that reproduction power is 0.35 mW when measuring an optical disc. In other words, substantially, an optical disc is essential not to be deteriorated by the power of 0.35 mW when reproducing.

Furthermore, when assuming an actual disc drive, it is considered that laser power fluctuates in the surrounding of use. Therefore, it is essential to consider that laser power will increase the order of 5% higher than the specified value. In other words, a Blu-ray Disc must withstand reproduction light of 0.3675 mW or more that is higher than 0.35 mW by 5%. Actually, a Blu-ray Disc must withstand reproduction light of 0.37 mW or more, because laser power is designated by every 0.01 mW. Accordingly, a recording material constituted by GeSbTe system material is essential to be improved in recording and reproducing characteristics more.

In order to solve the above-mentioned problem, according to the present invention, balance of Sb and Te is designated within a predetermined range and an amount of Ge is specified with respect to a GeSbTe system material as a phase-change type optical recording layer.

Further, by adding a proper amount of titanium (Ti) and indium (In) into the GeSbTe system material, an optical disc, which exhibits excellent recording and reproducing characteristics by using an optical disc system equipped with a blue laser beam and strong durability against reproduction light and less deterioration by rewriting a small number of times in comparison with a conventional recording material constituted by GeSbTe only, is obtained. Further details will follow.

Following embodiments are based on the above-mentioned 12 samples, which are capable of a next-generation blue laser beam and enable to be recorded by a shorter pulse width sufficiently and are rewritable as mentioned above. Four samples are further selected from the 12 samples, wherein the four samples are the sample Nos. 2, 4, 7 and 17 in FIG. 4. By adding Ti and In to the selected four samples, a specific effect that is never achieved by the conventional constitution is detailed next.

FIG. 5 is a table exhibiting recording power and strategy as recording conditions according to each embodiment of the present invention. In FIG. 5, each of reference signs P1 through P4 and T1 through T4 is correspond to those of the recording strategy shown in FIG. 2.

It should be understood that sample Nos. 2, 4, 7, and 17 shown in FIG. 5 correspond to sample Nos. shown in FIG. 4 and also correspond to each embodiment of the present invention.

FIG. 6 is a comparison table showing a C/N at each of "immediately after" and "5 minutes after" still mode reproduction is started with respect to each sample according to each embodiment. The table further exhibits a C/N at each reproduction power of 0.3 mW and 0.38 mW.

Embodiment One

FIG. 7 is a table exhibiting constitutional composition, durability against reproduction light, and average initial jitter with respect to each optical disc of sample Nos. "2" and "2-v1" to "2-v7" according to an embodiment one of the present invention.

FIG. 8 is a table exhibiting constitutional composition, jitter, and durability against reproduction light with respect to each sample according to the embodiment one of the present invention. In FIG. 8, a reference sign "Y" in a line of "Judgement" denotes that a corresponding sample satisfies the "Blu-ray Disc Standard Specifications" with respect to initial jitter, jitter after second time recording, and durability against reproduction light. On the contrary, a reference sign "N" denotes that a corresponding sample fails to satisfy the "Blu-ray Disc Standard Specifications".

FIG. 9 is a comparison table among the sample Nos. 2, "2-v1" and "2-v11" showing constitutional composition, average initial jitter, jitter after second time recording and durable reproduction power.

By the sputtering method, an Ag alloy as a reflective layer 2, ZnS—SiO$_2$ as a first protective layer 3, TiInGeSbTe as a recording layer 4, and ZnS—SiO$_2$ as a second protective layer 5 are sequentially formed on a polycarbonate substrate 1 having a diameter of 120 mm. Then, by using ultraviolet curable resin as an adhesive layer 6, a cover sheet layer 7 is adhered thereon. Consequently, an optical disc of sample No. 2 is manufactured. In this constitution, each film thickness of the reflective layer 2, the first protective layer 3, the recording layer 4, and the second. protective layer 5 is 200 nm, 8 nm, 14 nm, and 36 nm respectively.

Further, compositions of the recording layer 4 in atomic percent are set to 0.5% of Ti, 0.5% of In, 3.4% of Ge, 72.3% of Sb, and 23.3% of Te. Ultraviolet ray is irradiated on the cover sheet layer 7 so as to harden the adhesive layer 6 sufficiently after the cover sheet layer 7 is adhered thereon. Then, the sample No. 2 is initialized by using the Initializer installed with a laser beam having a spot diameter of 120 μm, wherein initializing conditions are such that a linear velocity and a feed pitch is fixed to 4 m/s and 40 μm respectively and a laser output is 570 mW.

After initialization, an information signal modulated in 1–7 modulation is recorded at a linear velocity of 5.28 m/s under recording strategy shown in FIG. 2, and then reproduced. The recording strategy and recording power shown in FIG. 2 is as follows: P1=5.2 mW, P2=2.7 mW, P3=0.1 mW, P4=0.1 mW, T1=0.4T, T2=0.4T, T3=0.7T, and T4=0.7T, wherein 1T is defined as 15.1 nsec. Then, the recorded signal is reproduced and clock to data jitter is measured by slicing the reproduced signal along a center of amplitude. The recording strategy and power mentioned above are listed in the line of "Sample No. 2" in FIG. 5.

Jitter is measured by the Time Interval Analyzer: model TA520 manufactured by Yokogawa Electric Corp. Initial jitter after first recording is 6.91% that is an average of jitter at a front end and at a rear end of the record mark. Jitter after second time recording is 7.11%, and resulting in being recorded excellently. The optical disc according to the embodiment one is shown as a sample No. "2-v11" in FIG. 8. An initial jitter value hereupon is jitter of an optical disc itself. According to the "Blu-ray Disc Standard Specifications", a jitter value including a hardware side is defined as 10% or less, and further defined as 11% or less by rewriting a small number of times up to 10 times. Consequently, an initial jitter value of an optical disc alone is desirable to be at least 8% or less. In a case of recording a small number of times, a jitter value after second time recording in which jitter increases maximally is desirably suppressed to be 8% or less.

Further, the optical disc of the sample No. "2-v11" is recorded with a single signal having a length of 2T according to the above-mentioned recording strategy. A C/N is measured while a track recorded with the single signal is reproduced in the still reproduction mode. At this moment, each C/N at immediately after and 5 minutes after performing the still mode reproduction is measured while reproduction power is changed from 0.30 mW to 0.40 mW by every 0.01 mW. A maximum value of reproduction power, which satisfies a range of 0.2 dB or less with respect to a difference of C/N between the immediately after and the 5 minutes after the still mode reproduction is started, is defined as durable reproduction power. Generally, measuring equipment such as a spectrum analyzer lead to an error of the order of 0.2 dB with respect to a C/N.

In a case that reproduction is deteriorated by reproduction light, deterioration of C/N can be almost confirmed by conducting the still mode reproduction for a period of the order of one minute. In this case, after 5 minutes elapsed, a deteriorated amount of C/N definitely exceeds 0.2 dB and having deteriorated can be confirmed thoroughly. Consequently, a standard for deterioration by reproduction light is defined as 0.2 dB with respect to C/N difference.

According to the above-mentioned measurement, with respect to the optical disc of the embodiment one, each C/N at immediately after and 5 minutes after the still mode reproduction is started is 50.2 dB and 50.2 dB respectively. A C/N is measured by a spectrum analyzer and is the average of 16 data.

In the optical disc of the embodiment one, as shown in FIG. 6, there is no difference between the C/N at "immediately after" and the C/N at "5 minutes after". In other words, it is understood that the optical disc of the sample No. "2-v11" offers a stable performance without deteriorating reproduction.

Explanation with respect to reproduction light is given at this moment. A record mark of which jitter is the worst of all record marks to be recorded is a 2T record mark as a shortest record mark that is hard to be recorded. The reason why the shortest record mark is hard to be recorded is that an irradiation time of a laser beam when recording, that is, a record mark forming time is shortest; Therefore, it takes longer time to form a record mark. In other words, if jitter of the 2T record mark is reduced to less than 9%, jitter of all record marks can surely be reduced to less than 9%, and resulting in reducing synthesized jitter extremely. It is experimentally known that a necessary C/N for reducing the jitter of the 2T record mark alone to 9% is 51.0 dB or more.

In a case that a phase-change type optical recording layer is made from GeSbTe excluding Ti hereupon, a C/N becomes 50.0 dB when reproduced by power of 0.3 mW, wherein the power is based on the "Blu-ray Disc Standard Specifications". It is experimentally confirmed that a C/N is confined to 50.0 dB and will not reach to 51.0 dB although the reproduction light is increased up to 0.36 mW as high as the maximum durable power.

On the other hand, in a case of the optical disc of the sample No. "2-v11" according to the embodiment one of the present invention of which phase-change type optical recording layer is made from GeSbTe containing Ti, durable reproduction power is 0.38 mW to 0.40 mW. The relatively higher durable reproduction power is caused by that Ti is the element having higher melting point and is thermally stable extremely and will not react against Ge, Sb and Te constituting a phase-change type optical recording layer, and further Ti is a stable substance, which will not react against materials constituting an adjoining protective layer. By adding an appropriate amount of Ti, the added Ti functions as an anchor in the recording layer and makes a record mark edge sharper when forming a record mark, and resulting in reducing jitter.

Further, as mentioned above, Ti is such a substance having higher melting point, so that Ti is excellent in thermal durability. Consequently, the phase-change type optical recording layer made from GeSbTe containing Ti is supposed to be able to withstand stronger power with respect to reproduction light.

Furthermore, in a case that the optical disc of the sample No. "2-v11" is reproduced by the power of 0.30 mW based upon the "Blu-ray Disc Standard Specifications", a C/N is 50.2 dB maximum. However, in a case that the reproduction power is increased up to 0.38 mW, a C/N at immediately after a still mode reproduction is started is 51.1 dB and a C/N at 5 minutes after the still mode reproduction is started is also 51.1 dB. Consequently, the C/N results in reaching to 51.1 dB. In other words, the C/N value sufficiently satisfies the above-mentioned C/N condition necessary for the jitter of the 2T record mark alone to be suppressed to 9% even when forming the 2T record mark as a shortest record mark that is hard to be recorded. These C/N values are shown in a line of sample No. "2-v11 to 2-v14 and 2-v51 to 2-v54" in FIG. 6.

Referring back to FIG. 8, the jitter value of the sample No. "2-v11" according to the embodiment one is almost similar to that of a sample No. "2-v1" of which recording layer excludes In. However, the jitter after second time recording of the sample No. "2-v11" is lower than that of the sample No. "2-v1". It is understood that a rise of jitter is slightly suppressed by adding indium (In).

In this connection, with respect to the sample No. 2 of which recording layer excludes In, values of initial jitter and jitter after second time recording and durable reproduction power are shown in. FIG. 9. According to FIG. 9, adding Ti into GeSbTe exhibits effects on reducing initial jitter and increasing durability against reproduction light. However, it is known that there is almost no difference between the sample Nos. 2 and "2-v1" in the rise of jitter caused by second time recording. On the contrary, in the case of the sample No. "2-v11" that is added with In as well as Ti, as shown in FIGS. 8 and 9, the rise of jitter is superior to that of the sample No. 2 or "2-v1". Consequently, it is understood that the effect of suppressing the rise of jitter caused by second time recording shown in FIGS. 8 and 9 is resulted from In being added. In this connection, since In is a material having a lower melting point, therefore, it seems that melting a recording layer progresses smoothly while irradiating recording light, and resulting in enabling to rewrite in least residual of erasing.

Optical discs of sample Nos. "2-v12 to 2-v15" and "2-v51 to 2-v55" are manufactured and experimented, wherein an amount of Ge and a value of Sb/Te are set to the same as those of the embodiment one, that is, the sample No. "2-v11", and further each amount of Sb and Te is slightly changed from those of the sample No. "2-v11". In the case of the sample Nos. "2-v12" to "2-v15", as shown in FIG. 8, an amount of Ti is fixed to 0.5% and an amount of In is changed from 1.0% to 4.0%. In the case of the sample Nos. "2-v51to 2-v55", as shown in FIG. 8, an amount of Ti is fixed to 4.0% and an amount of In is changed from 0.5% to 4.0%. Results of the experiment are shown in FIG. 8.

According to the experiment, as shown in FIG. 8, it is confirmed that no matter whether an amount of Ti is set to 0.5% or 4.0%, a rise of jitter is suppressed in so far as an amount of In is increased to 0.5% or more. However, as shown in columns "2-v15" and "2-v55" in FIG. 8, durable reproduction power decreases down to 0.33 mW when the amount of In is set to 4.0% in comparison with 0.38 mW when the amount of In is set to 3.0% or less. Indium (In) that is low in melting point is extremely deteriorated by reproduction light if an additive amount of In is excessive. Consequently, a record mark is supposed to be re-crystallized and to disappear.

In a case that an amount of Ti is 0.5% to 4.0% and an amount of In is 0.5% to 3.0%, the average initial jitter becomes less than 8% and the jitter after second time recording becomes less than 8% and the durable reproduction power becomes 0.38 mW. Consequently, it is understood that any optical discs of the sample Nos. "2-v12 to 2-v14" and "2-v51 to 2-v54" satisfy the "Blu-ray Disc Standard Specifications" sufficiently.

With respect to an amount of Ti, the above-mentioned sample Nos. 2, 4, 7, and 17 are examined under a condition of adding no In, and then a most suitable range of an amount of Ti is detected. Results of examination are shown in FIGS. 7, 10, 12 and 14 (to be detailed later). In any optical discs of the sample Nos. 2, 4, 7, and 17, it is confirmed that durability against reproduction light increases and jitter decreases in so far as the amount of Ti is within a range of 0.5% to 4.0%.

In addition, the recording conditions of the sample No. 2 shown in FIG. 5 are applied to the sample Nos. "2-v1" to "2-v7" in FIG. 7 and sample Nos. "2-v11" to "2-v15" and "2-v51" to "2-v55" in FIG. 8.

Embodiment Two

FIG. 10 is a table exhibiting constitutional composition, durability against reproduction light, and average initial jitter with respect to each optical disc of sample Nos. "4-v1" to "4-v7" according to an embodiment two of the present invention.

FIG. 11 is a table exhibiting constitutional composition, jitter, and durability against reproduction light with respect to each sample according to the embodiment two of the present invention. In FIG. 11, a reference sign "Y" in a line of "Judgement" denotes that a corresponding sample satisfies the "Blu-ray Disc Standard Specifications" with respect to initial jitter, jitter after second time recording, and durability against reproduction light. On the contrary, a reference sign "N" denotes that a corresponding sample fails to satisfy the "Blu-ray Disc Standard Specifications".

Recording conditions of a sample No. 4 shown in FIG. 5 are applied to the sample Nos. "4-v1" to "4-v7" in FIG. 10, and sample Nos. "4-v11 to 4-v15" and "4-v51 to 4-v55" in FIG. 11.

Optical discs of sample Nos. "4-v11 to 4-v15" and "4-v51 to 4-v55" are manufactured and experimented, wherein an amount of Ge is set to 4.3% and a value of Sb/Te is set to 2.1, and the experiment is conducted by changing each amount of Sb and Te. In the case of the sample Nos. "4-v11 to "4-v15", an amount of Ti is fixed to 0.5% and an amount of In is changed from 0.5% to 4.0%. In the case of the sample Nos. "4-v51 to "4-v55", an amount of Ti is fixed to 4.0% and an amount of In is changed from 0.5% to 4.0%.

Further, the optical discs of the sample Nos. "4-v11 to 4-v15" and "4-v51 to 4-v55" are recorded under the same recording conditions as those of the embodiment one as shown in FIG. 5, and then they are reproduced and experimented. Results of the experiment are shown in FIG. 11.

According to the experiment, as shown in FIG. 11, average initial jitter becomes less than 8% and the jitter after second time recording becomes less than 8% and the durable reproduction power becomes 0.38 mW in so far as an amount of Ti is 0.5% to 4.0% and an amount of In is 0.5% to 3.0%. Consequently, it is understood that any optical discs of the sample Nos. "4-v11 to 4-v14" and "4-v51 to 4-v54" satisfy the "Blu-ray Disc Standard Specifications" sufficiently.

Embodiment Three

FIG. 12 is a table exhibiting constitutional composition, durability against reproduction light, and average initial jitter with respect to each optical disc of sample Nos. "7" and "7-v1" to "7-v7" according to an embodiment three of the present invention.

FIG. 13 is a table exhibiting constitutional composition, jitter, and durability against reproduction light with respect to each sample according to the embodiment three of the present invention. In FIG. 13, a reference sign "Y" in a line of "Judgement" denotes that a corresponding sample satisfies the "Blu-ray Disc Standard Specifications" with respect to initial jitter, jitter after second time recording, and durability against reproduction light. On the contrary, a reference sign "N" denotes that a corresponding sample fails to satisfy the "Blu-ray Disc Standard Specifications".

Recording conditions of a sample No. 7 shown in FIG. 5 are applied to the sample Nos. "7-v1" to "7-v7" in FIG. 12, and sample Nos. "7-v11 to 7-v15" and "7-v51 to 7-v55" in FIG. 13.

Optical discs of sample Nos. "7-v11 to 7-v15" and "7-v51 to 7-v55" are manufactured and experimented, wherein an amount of Ge is set to 4.6% and a value of Sb/Te is set to 4, and the experiment is conducted by changing each amount of Sb and Te. In the case of the sample Nos. "7-v11 to "7-v15", an amount of Ti is fixed to 0.5% and an amount of In is changed from 0.5% to 4.0%. In the case of the sample Nos. "7-v51 to "7-v55", an amount of Ti is fixed to 4.0% and an amount of In is changed from 0.5% to 4.0%.

Further, the optical discs of the sample Nos. "7-v11 to 7-v15" and "7-v51 to 7-v55" are recorded under. the. similar recording conditions to those of the embodiment one except for P2 and strategy T as shown in FIG. 5, and then they are reproduced and experimented. Results of the experiment are shown in FIG. 13. According to the experiment, as shown in FIG. 13, average initial jitter becomes less than 8% and the jitter after second time recording becomes less than 8% and the durable reproduction power becomes 0.38mW in so far as an amount of Ti is 0.5% to 4.0% and an amount of In is 0.5% to 3.0%. Consequently, it is understood that any optical discs of the sample Nos. "7-v11 to 7-v14" and "7-v51 to 7-v54" satisfy the "Blu-ray Disc Standard Specifications" sufficiently.

Embodiment Four

FIG. 14 is a table exhibiting constitutional composition, durability against reproduction light, and average initial jitter with respect to each optical disc of sample Nos. "17" and "17-v1" to "17-v7" according to an embodiment four of the present invention.

FIG. 15 is a table exhibiting constitutional composition, jitter, and durability against reproduction light with respect to each sample according to the embodiment four of the present invention. In FIG. 15, a reference sign "Y" in a line of "Judgement" denotes that a corresponding sample satisfies the "Blu-ray Disc Standard Specifications" with respect to initial jitter, jitter after second time recording, and durability against reproduction light. On the contrary, a reference sign "N" denotes that a corresponding sample fails to satisfy the "Blu-ray Disc Standard Specifications".

Recording conditions of a sample No. 17 shown in FIG. 5 are applied to the sample Nos. "17-v1" to "17-v7" in FIG. 14, and sample Nos. "17-v11 to 17-v15" and "17-v51 to 17-v55" in FIG. 15.

Optical discs of sample Nos. "17-v11 to 17-v15" and "17-v51 to 17-v55" are manufactured and experimented, wherein an amount of Ge is set to 14.5% and a value of Sb/Te is set to 3.2, and the experiment is conducted by changing each amount of Sb and Te. In the case of the sample Nos. "17-v11 to "17-v15", an amount of Ti is fixed to 0.5% and an amount of In is changed from 0.5% to 4.0%. In the case of the sample Nos. "17-v51" to "17-v55", an amount of Ti is fixed to 4.0% and an amount of In is changed from 0.5% to 4.0%.

Further, the optical discs of the sample Nos. "17-v11 to 17-v15" and "17-v51 to 17-v55" are recorded under the same recording conditions as those of the embodiment one as shown in FIG. 5, and then they are reproduced and experimented. Results of the experiment are shown in FIG. 15. According to the experiment, as shown in FIG. 15, average initial jitter becomes less than 8% and the jitter after second time recording becomes less than 8% and the durable reproduction power becomes 0.40 mW in so far as an amount of Ti is 0.5% to 4.0% and an amount of In is 0.5% to 3.0%. Consequently, it is understood that any optical discs of the sample Nos. "17-v11 to 17-v14" and "17-v51 to 17-v54" satisfy the "Blu-ray Disc Standard Specifications" sufficiently.

Embodiment Five

FIG. 16 is a table exhibiting constitutional composition, jitter, and durability against reproduction light with respect to each sample of sample Nos. "2-v20" to "2-v26" according to an embodiment five of the present invention. In FIG. 16, a reference sign "Y" in a line of "Judgement" denotes that a corresponding sample satisfies the "Blu-ray Disc Standard Specifications" with respect to initial jitter, jitter after second time recording, and durability against reproduction light. On the contrary, a reference sign "N" denotes that a corresponding sample fails to satisfy the "Blu-ray Disc Standard Specifications".

Optical discs of the sample Nos. "2-v20" to "2-v26" are manufactured and experimented, wherein an amount of Ge and a value of Sb/Te is set to 3.4% and 3.1 respectively that are the same configuration as those of the embodiment one, and wherein the experiment is conducted by changing each amount of Sb and Te. In these optical discs of the sample Nos. "2-v20" to "2-v26", an amount of Ti is fixed to 0.3% and an amount of In is set to 0% to 4.0%.

Further, the optical discs of the sample Nos. "2-v20" to "2-v26" are recorded under the same recording conditions as those of the sample No. 2 shown in FIG. 5, and then they are reproduced and experimented. Results of the experiment are shown in FIG. 16.

According to the experiment, with respect to the sample Nos. "2-v21" to "2-v25", average initial jitter becomes less than 8% and the jitter after second time recording becomes less than 8% and the durable reproduction power becomes 0.38 mW as shown in FIG. 16 in so far as an amount of In is 0.3% to 3.0%. Consequently, it is understood that any optical discs of the sample Nos. "2-v21" to "2-v25" satisfy the "Blu-ray Disc Standard Specifications" sufficiently.

Embodiment Six

FIG. 17 is a table exhibiting constitutional composition, jitter, and durability against reproduction light with respect to each sample of sample Nos. "4-v20" to "4-v26" according to an embodiment six of the present invention. In FIG. 17, a reference sign "Y" in a line of "Judgement" denotes that a corresponding sample satisfies the "Blu-ray Disc Standard Specifications" with respect to initial jitter, jitter after second time recording, and durability against reproduction light. On the contrary, a reference sign "N" denotes that a corresponding sample fails to satisfy the "Blu-ray Disc Standard Specifications".

Optical discs of the sample Nos. "4-v20" to "4-v26" are manufactured and experimented, wherein an amount of Ge and a value of Sb/Te is set to 4.3% and 2.1 respectively that are the same configuration as those of the embodiment two, and wherein the experiment is conducted by changing each amount of Sb and Te. In these optical discs of the sample Nos. "4-v20" to "4-v26", an amount of Ti is fixed to 0.3% and an amount of In is set to 0% to 4.0%.

Further, the optical discs of the sample Nos. "4-v20" to "4-v26" are recorded under the same recording conditions as those of the sample No. 4 as shown in FIG. 5, and then they are reproduced and experimented. Results of the experiment are shown in FIG. 17.

According to the experiment, with respect to the sample Nos. "4-v21" to "4-v25", average initial jitter becomes less than 8% and the jitter after second time recording becomes less than 8% and the durable reproduction power becomes 0.38 mW as shown in FIG. 17 in so far as an amount of In is 0.3% to 3.0%. Consequently, it is understood that any optical discs of the sample Nos. "4-v21" to "4-v25" satisfy the "Blu-ray Disc Standard Specifications" sufficiently.

Embodiment Seven

FIG. 18 is a table exhibiting constitutional composition, jitter, and durability against reproduction light with respect to each sample of sample Nos. "7-v20" to "7-v26" according to -an embodiment seven of the present invention. In FIG. 18, a reference sign "Y" in a line of "Judgement" denotes that a corresponding sample satisfies the "Blu-ray Disc Standard Specifications" with respect to initial jitter, jitter after second time recording, and durability against reproduction light. On the contrary, a reference sign "N" denotes that a corresponding sample fails to satisfy the "Blu-ray Disc Standard Specifications".

Optical discs of the sample Nos. "7-v20" to "7-v26" are manufactured and experimented, wherein an amount of Ge and a value of Sb/Te is set to 4.6% and 4 respectively that are the same configuration as those of the embodiment three, and wherein the experiment is conducted by changing each amount of Sb and Te. In these optical discs of the sample Nos. "7-v20" to "7-v26", an amount of Ti is fixed to 0.3% and an amount of In is set to 0% to 4.0%.

Further, the optical discs of the sample Nos. "7-v20" to "7-v26" are recorded under the same recording conditions as those of the sample No. 7 shown in FIG. 5, and then they are reproduced and experimented. Results of the experiment are shown in FIG. 18.

According to the experiment, with respect to the sample Nos. "7-v21 to "7-v25", average initial jitter becomes less than 8% and the jitter after second time recording becomes less than 8% and the durable reproduction power becomes 0.38 mW as shown in FIG. 18 in so far as an amount of In is 0.3% to 3.0%. Consequently it is understood that any optical discs of the sample Nos. "7-v21" to "7-v25" satisfy the "Blu-ray Disc Standard Specifications" sufficiently.

Embodiment Eight

FIG. 19 is a table exhibiting constitutional composition, jitter, and durability against reproduction light with respect to each sample of sample Nos. "17-v20" to "17-v26" according to an embodiment six of the present invention. In FIG. 19, a reference sign "Y" in a line of "Judgement" denotes that a corresponding sample satisfies the "Blu-ray Disc Standard Specifications" with respect to initial jitter, jitter after second time recording, and durability against reproduction light. On the contrary, a reference sign "N" denotes that a corresponding sample fails to satisfy the "Blu-ray Disc Standard Specifications".

Optical discs of the sample Nos. "17-v20" to "17-v26" are manufactured and experimented, wherein an amount of Ge and a value of Sb/Te is set to 14.5% and 3.2 respectively that are the same configuration as those of the embodiment four, and wherein the experiment is conducted by changing each amount of Sb and Te. In these optical discs of the sample Nos. "17-v20" to "17-v26", an amount of Ti is fixed to 0.3% and an amount of In is set to 0% to 4.0%.

Further, the optical discs of the sample Nos. "17-v20" to "17-v26" are recorded under the same recording conditions as those of the sample No. 17 shown in FIG. 5, and then they are reproduced and experimented. Results of the experiment are shown in FIG. 19.

According to the experiment, with respect to the sample Nos. "17-v21" to "17-v25", average initial jitter becomes less than 8% and the jitter after second time recording becomes less than 8% and the durable reproduction power becomes 0.40 mW as shown in FIG. 19 in so far as an amount of In is 0.3% to 3.0%. Consequently, it is understood that any optical discs of the sample Nos. "17-v21" to "17-v25" satisfy the "Blu-ray Disc Standard Specifications" sufficiently.

According to the embodiments five through eight mentioned above, it is understood that an optical disc can satisfy the "Blu-ray Disc Standard Specifications" in so far as a recording layer 4 contains 0.3% or more of Ti and In.

COMPARATIVE EXAMPLE

An optical disc according to a comparative example is manufactured as follows.

By the sputtering method, an Ag alloy as a reflective layer 2, ZnS—SiO$_2$ as a first protective layer 3, GeSbTe as a recording layer 4, and ZnS—SiO$_2$ as a second protective layer 5 are sequentially formed on a polycarbonate substrate 1 having a diameter of 120 mm. Then by using ultraviolet curable resin as an adhesive layer 6, a cover sheet layer 7 is adhered thereon. In this constitution, each film thickness of the reflective layer 2, the first protective layer 3, the recording layer 4, and the second protective layer 5 is 200 nm, 8 nm, 14 nm, and 36 nm respectively.

Further, compositions of the recording layer 4 in atomic percent are set to 8.7% of Ge, 69.7% of Sb, and 21.6% of Te. Ultraviolet ray is irradiated on the cover sheet layer 7 so as to harden the adhesive layer 6 sufficiently after the cover sheet layer 7 is adhered. Then, the optical disc of the comparative example is initialized by using the Initializer installed with a laser beam having a spot diameter of 120 μm, wherein initializing conditions are such that a linear velocity and a feed pitch is fixed to 4 m/s and 40 μm respectively and a laser output is 570 mW.

After the initialization, an information signal modulated in 1-7 modulation is recorded in a groove of an optical disc according to the comparative example at a linear velocity of 5.28 m/s under recording conditions, wherein recording strategy and recording power shown in FIG. 2 is as follows: P1=5.2 mW, P2=2.7 mW, P3=0.1 mW, P4=0.1 mW, T1=0.4T, T2=0.4T, T3=0.7T, and T4=0.7T, wherein 1T is defined as 15.1 nsec. Then, the recorded signal is reproduced and clock to data jitter is measured by slicing the reproduced signal along a center of amplitude.

Jitter is measured by the Time Interval Analyzer: model TA520 manufactured by Yokogawa Electric Corp. Jitter after first recording is 7.8% that is an average of jitter at a front end and at a rear end of the record mark, and resulting in being able to record normally. Jitter after second time recording is 8.9%.

Further, the optical disc of the comparative example is recorded with a single signal having a length of 2T according to the above-mentioned recording strategy. A C/N is measured while a track recorded with the single signal is reproduced in the still reproduction mode. At this moment, reproduction power is set to 0.30 mW that is supposed not to deteriorate the optical disc. A C/N at immediately after the still mode reproduction is started is 50.0 dB and a jitter at 5 minutes after the still mode reproduction is started is also 50.0 dB.

While measuring a C/N, a C/N remains in 50.0 dB and never reaches to 51.0 dB, which is necessary for jitter of the signal having a length of 2T alone to be 9%, although reproduction power is increased up to 0.36 mW that is the maximum durable power.

With respect to a measurement of C/N, by using a spectrum analyzer, a C/N is measured 16 times and an average of 16 data is defined as a measured value of C/N. Since an error of the order of 0.2 dB possibly occurs as a measurement error, it is assumed to be excellent that a change of C/N before and after examining deteriorated reproduction is 0.2 dB or less. The above-mentioned measuring method, conditions and equipment are the same as those used for the embodiments one through eight.

Compositions constituting the recording layer 4 other than the compositions detailed in the above-mentioned comparative example are also examined. The examined compositions are shown in FIG. 4.

As it is apparent from FIG. 4, an optical disc 10, which is composed of a GeSbTe system material as a phase-change type optical recording layer and offers strong durability against reproduction light as well as being capable of an optical disc system using a blue laser beam, exhibits that deterioration of C/N by reproduction power of 0.30 mW in the still mode reproduction is within 0.2 dB and initial jitter is less than 9% in so far as each preferable composition range of Ge, Sb and Te is such that Ge is more than 3.4% and less than 14.5% in atomic percent, and a Sb/Te is more than 2.1 and less than 4.

The above-mentioned preferable composition range is such a range as reproduction is never deteriorated.

In this connection, further details are explained next. A range of Ge is explained first.

Increasing an amount of Ge improves contrast, and results in increasing resistance against environmental load. A minimum amount of Ge is defined as 3.4% (atomic percent). However, it may deviate a little in consideration of measurement error. In a case that an amount of Ge is small, it is experimentally evident that jitter is hardly decreased, particularly. However, a larger amount of Ge is not always the better.

In a case of increasing an amount of Ge, an amount of Sb decreases relatively, and resulting in decreasing a crystallizing speed. In other words, a slower crystallizing speed disables to record or rewrite in higher linear velocity.

Further, it is experimentally evident that a smaller amount of Sb makes a crystallizing speed slower even in a same Sb/Te ratio. In this case, insufficient erasing possibly occurs by such a slower crystallizing speed while rewriting.

On the other hand, increasing an amount of Ge makes a crystallizing speed higher. A recording layer crystallized by a higher temperature offers higher durability such that reproduction is extremely low in deterioration when recorded. However, if a crystallizing temperature is raised too much, initializing a recording layer is apt to be harder. An upper limit of Ge amount is 14.5% (atomic percent) in so far as it can be examined.

A ratio of Sb/Te is explained next. As mentioned above, a ratio of Sb/Te affects a crystallizing speed. In a case that the ratio of Sb/Te is larger, a crystallizing speed increases, and resulting in enabling to record and rewrite by a faster linear velocity. On the contrary, in a case that the ratio is small, a crystallizing speed decreases. In the embodiments one through eight of the present invention, the lower limit of the ratio is defined as 2.1 because crystallization during the initializing process becomes harder in the region of 2.1.

Further, in a case that the ratio is less than 2.1, a crystallization state becomes unstable and such defects as contrast is deteriorated and overwriting is disabled are apt to happen.

On the other hand, the upper limit of the ratio of Sb/Te is defined as 4. However, in a case that the ratio is increased, an amorphous record mark is formed insufficiently because a recording layer is easily crystallized. If an amorphous record mark happen to be formed, a recorded record mark happens to disappear when reproducing the recorded part in the still reproduction mode, because the recorded amorphous record mark is weak in strength for reproduction light.

The composition of the sample No. 15 shown in FIG. 4 that is examined as the comparative example exhibits excellent characteristics by itself and enables to withstand up to 0.35 mW of reproduction power. However, as mentioned above, the sample No. 15 can hardly realize jitter of a signal having a length of 2T to be less than 9% because durable reproduction power of the sample No. 15 is at most 50.0 dB. In other words, the optical disc of the sample No. 15 fails to comply with an optical information recording medium according to the present invention, which enables to withstand reproduction light in higher output and to be recorded in lower jitter so as to satisfy the "Blu-ray Disc Standard Specifications".

Composition of a recording layer 4 is mixed with an impurity such as Fe, Al, and Si although the impurity is an extremely small amount. Such an impurity can be suppressed to be less than 1% in total when the total amount of constituting elements of the recording layer 4 is defined as 100% in atomic percent. By adding each element of the above-mentioned impurities into the constitutional composition of the recording layer 4 of the sample No. "2-v11" according to the embodiment one of the present invention, influence of the impurity is examined. Results of the examination are shown in FIGS. 20–22.

FIG. 20 is a table exhibiting constitutional composition, jitter, and durability against reproduction light when added with 1% of an additive element with respect to the sample No. "2-v11" of the embodiment one of the present invention.

FIG. 21 is a table exhibiting constitutional composition, jitter, and durability against reproduction light when added with 1.1% of an additive element with respect to the sample No. "2-v11" of the embodiment one of the present invention.

FIG. 22 is a table exhibiting constitutional composition, jitter, and durability against reproduction light when added with 1.2% of an additive element with respect to the sample No. "2-v11" of the embodiment one of the present invention.

In FIGS. 20–22, a reference sign "Y" denotes that a corresponding sample satisfies the "Blu-ray Disc Standard Specifications" with respect to initial jitter, jitter after second time recording, and durability against reproduction light. On the contrary, a reference sign "N" denotes that a corresponding sample fails to satisfy the "Blu-ray Disc Standard Specifications".

Each impurity of Fe, Al and Si is added within a range of 1.0 to 1.2% (atomic percent) as an additive element. In a case that an additive amount of an impurity is 1.0%, as shown in FIG. 20, average initial jitter, jitter after second time recording, and durable reproduction power is less than 8%, less than 8% and 0.38 mW respectively. It is understood that any optical discs shown in FIG. 20 added with 1.0% of the impurity satisfy the "Blu-ray Disc Standard Specifications" sufficiently.

In a case that an additive amount of an impurity is 1.1%, as shown in FIG. 21, average initial jitter, jitter after second time recording, and durable reproduction power is less than 8%, less than 8% and 0.38 mW respectively. Accordingly, It is understood that any optical discs shown in FIG. 21 added with 1.1% of the impurity satisfy the "Blu-ray Disc Standard Specifications" sufficiently.

On the other hand, in a case that an additive amount of an impurity is 1.2%, as shown in FIG. 22, average initial jitter and jitter after second time recording exceeds 8%. Consequently, it is understood that any optical discs shown in FIG. 22 added with 1.2% of the impurity fail to satisfy the "Blu-ray Disc Standard Specifications" sufficiently.

As mentioned above, in the case that the total amount of compositional elements (Ti, In, Ge, Sb and Te) is 98.8% or more, an optical information recording medium, which is low in initial jitter and jitter after second time recording, and withstands reproduction power having a higher output, can be obtained.

Further, in the case of containing 1.1% of an impurity, a rise ratio of jitter is relatively large. Consequently, it is more desirable for an additive amount of impurity to be 1.0% or less. In other words, it is more desirable that a total amount of constitutional composition of the recording layer 4 is 90.0% or more.

As it is apparent from the detailed explanations mentioned above, an optical information recording medium of the present invention is composed of a substrate and a phase-change type optical recording layer that is one of a plurality of layers formed on the substrate. The phase-change type optical recording layer contains at least Ti, In, Ge, Sb and Te. In a case that each content in atomic percent of the Ti, In, Ge, Sb and Te is defined as "v", "w", "x", "y" and "z", each of the contents "v", "w", "x", "y" and "z" satisfies following relations:

$$0.3 \leq v \leq 4,$$

$$0.3 \leq w \leq 3,$$

$$3.4 \leq x \leq 14.5, \text{ and}$$

$$2.1 \leq y/z \leq 4.$$

In the embodiments of the present invention, it is defined that "v+w+x+y+z=100" atomic percent. However, containing a small amount of other material is acceptable, that is, "v+w+x+y+z≦100" atomic percent. It is essential, however, that "v+w+x+y+z≧98.8" atomic percent.

Further, it is desirable that "v+w+x+y+z≧99.0" atomic percent.

According to the constitution of each optical information recording medium of the embodiments one through eight of the present invention characterizing the above-mentioned relations, it is understood that advantageous characteristic results, which are never achieved by a recording material made from only GeSbTe, can be obtained.

It should be understood that many modifications and adaptations of the invention will become apparent to those skilled in the art and it is intended to encompass such obvious modifications and changes in the scope of the claims appended hereto.

What is claimed is:

1. An optical information recording medium for recording information comprising:
   a substrate; and
   a phase-change type optical recording layer provided as one of a plurality of layers formed on the substrate,
   the phase-change type optical recording layer further containing at least Ti, In, Ge, Sb and Te, when defining each content amount of the Ti, In, Ge, Sb and Te as v, w, x, y and z in atomic percent respectively, each content amount of v, w, x, y and z in atomic percent satisfying following relations:

$$0.3 \leq v \leq 4,$$

$$0.3 \leq w \leq 3,$$

$$3.4 \leq x \leq 14.5,$$

$$2.1 \leq y/z \leq 4 \text{ and}$$

$$98.8 \leq v+w+x+y+z \leq 100.$$

* * * * *